though subjected to severe directional changes and shifting reversals of stress.

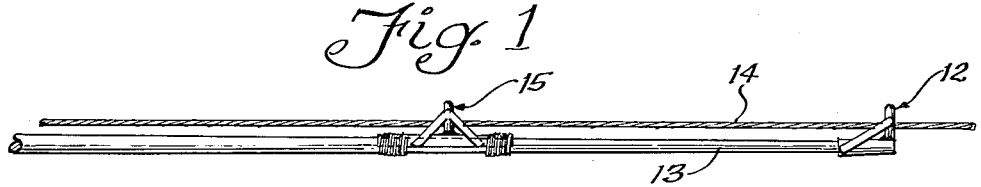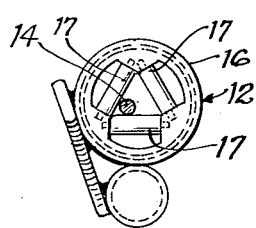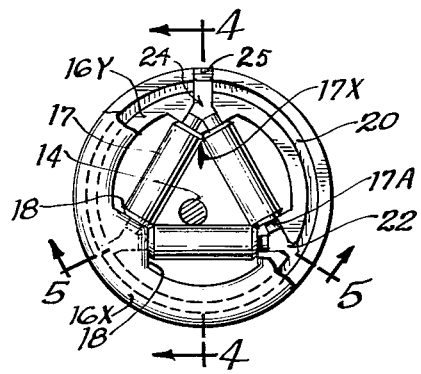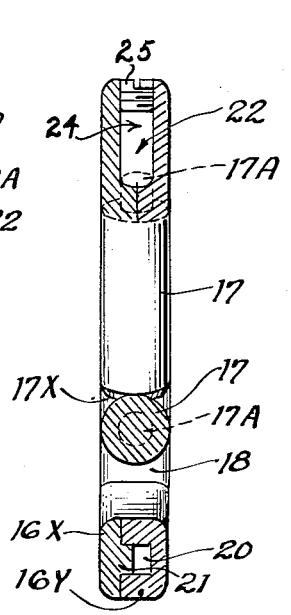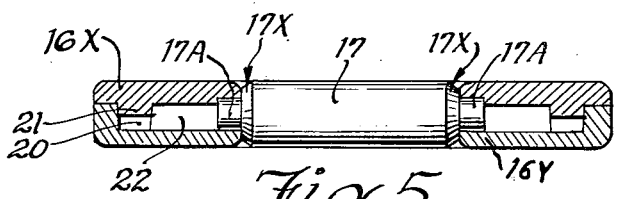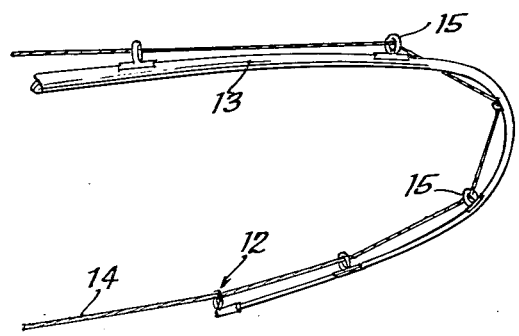

United States Patent Office 2,805,509
Patented Sept. 10, 1957

2,805,509

ROLLER LINE GUIDE AND TIP FOR FISHING RODS

De Witt William Inglis, Chicago, Ill.

Application January 28, 1954, Serial No. 406,752

1 Claim. (Cl. 43—24)

This invention has as its principal object the provision of an improved line guide or rod tip for fishing rods characterized by an arrangement of rollers so disposed as to afford free running action with the line in any sidewise direction at which the line may have to pay out or be reeled in.

Other important features of the new free-running tip and guide relate to details of construction including the arrangement of at least three rollers in axially contiguous relation for common interdriving action and to block off any opening into which the line might work itself.

A further feature resides in a construction of the guide which affords a lubricating system for the guide rollers.

Additional features and aspects of novelty and utility relate to details of the construction and operation of the illustrative embodiment described hereinafter in view of the annexed drawing, in which:

Fig. 1 is a fragmentary side elevation of the end portion of a rod equipped with the novel free-running guide;

Fig. 2 is an endwise elevational view of the rod and guide tip;

Fig. 3 is an enlarged cross-sectional detail of the roller system;

Fig. 4 is an enlarged cross-sectional detail through the guide tip along lines 4—4 of Fig. 3;

Fig. 5 is an enlarged cross-sectional detail through another portion of the tip and roller means taken along lines 5—5 of Fig. 3;

Fig. 6 is a perspective view of a portion of a rod recurved to illustrate a lateral or angular disposition of rod and line and conditions under which the roller system can pay out the line.

Referring to Fig. 1, the novel roller tip structure 12 and guide ferrule structure 15 are illustrated in attachment with a conventional fishing rod 13 employing a conventional line 14.

The guide roller means for the tip is the same as that for the intermediate guides, and accordingly only the tip structure will be described so far as the roller system is concerned.

In general, the roller system comprises a ring assembly 16 having journaled therein a triangularly situated array of contiguous rollers 17, the axially contiguous ends of which are respectively in driving engagement, as at 17X (see Fig. 3), the circumferentially endwise margins of the several rollers 17 being beveled to correspond to the angular pitch of the axes of contiguous rollers to provide a positive driving interface on each roller in these regions.

Each roller 17 has a short stud pivot 17A (Figs. 3, 4, and 5) seating in a journal cavity molded into the mating half-sections 16X, 16Y of the ring assembly, it being observed in Fig. 3 that the inner periphery of the ring 16 is provided with adjoining obtusely-angled abutment faces 18 (Fig. 3) in which the bearing or pivot studs 17A are journaled. Only a minimum clearance is allowed between these abutment faces and the axial end of the appertaining rollers in order that the line shall never snag or wedge itself into this region if for any reason it ever works past the interdriving bevels 17X on the rollers, something unlikely except in a case where an unusually fine line might improperly be used and the rollers had loosened from wear or damage, this being one of the important objects of the interdriving roller bevels 17X.

The ring assembly 16X, 16Y is preferably made of mating half-sections of stainless steel or Phosphor bronze, Monel metal or other non-rusting, non-corroding materials which are capable of resisting the action of salt water and exposure to rough usage and weather.

Formed within one of the mating ring sections, for instance, the member 16Y, as depicted in Figs. 3, 4, and 5, is a continuous lubricating groove 20, into which fits simply a shallow annular rib 21 formed on the inside face of the companion ring section 16X, and which is adapted to fit into the lubricating groove as a closure and seal (as in Figs. 4 and 5).

Feeder ducts 22 branch off from the lubricant groove 20 (Figs. 3, 4, and 5) into common communication with th axial ends of each pair of roller studs 17A to work into the journals by flow and capillarity where a suitable waterproof grease of the proper consistency is employed for the range of temperature in which the device is to be used, so as to become neither too thick nor too fluid.

The mating sections 16X, 16Y of the ring-like structure may be force-fitted or permanently sweated together; in either case, particularly the latter, a lubricant-filler passage 24 (Figs. 3 and 4) is provided and is fitted with a removable screw plug 25.

It will be understood from the foregoing description that the novel roller structure includes a plurality of rollers mounted for joint rotation in close end-to-end contiguity, such as will prevent the passage of a suitable line past the interdriving contact between any contiguously touching pair of roller ends.

The simplest of these roller arrays is the triangular array illustrated in Fig. 3, for example, although a large number of rollers may be employed on the larger and heavier sizes of gear, as for example in connection with deep-sea equipment.

The lubricating groove and feeder means 20, 22 is preferably packed with a water repellent graphite grease of suitable weight to assure its working to the roller pivots and stability under the conditions of exposure to the elements and working conditions under which the equipment is intended to be used.

The roller means obviously relieves wear and stress on the expensive lines generally employed for various fishing conditions, and reduces the losses and damage otherwise frequently resulting in breakage, weakening and straining of such lines when the old static type of guides and tips are used.

While roller guides have been suggested heretofore, such devices have been too costly or impractical for manufacturing purposes, or too bulky, or wholly ineffective in use.

The present disclosures afford a practical and effectively workable construction which can be made in small sizes for the lighter weight angling equipment.

It will be apparent from examination of Fig. 3, for example, that the line 14 can be displaced sidewise in any angular direction from the normal payout center within the guide ring 16, and will encounter rotatably movable surfaces somewhere along one or in between two of the rollers 17, and that such roller or rollers will ordinarily tend to turn with the passage of the line in or out.

In Fig. 6 a condition of the tackle is illustrated which is not uncommon, and it is intended in this view to depict the angular changes in direction and attitude which the line 14 can take, and the fact that the angular array of multiple rollers 17 will present a rollable or yieldable rolling surface to the line in all of the attitudes of the line illustrated, it being assumed that each of the several guides 15 and tip 12 has the novel roller construction of Figs. 2 and 3 as a part thereof for this purpose.

In the skillful use of the more expensive angling equipment of this class, the expert will commonly endeavor wherever possible to manipulate the rod and equipment in a manner to expose it to the least danger and stress or to minimize such hazards, so that conditions such as illustrated in Fig. 6 will not be permitted to endure if the angler can remedy the situation.

But even in less spectacular situations, the multiple roller array is effective to pay the line freely in any position whether in the position shown in full lines in Fig. 3, or the position in the junctural region between two rollers, as depicted in Fig. 2.

I claim:

A line guide for fishing rods comprising a ring having an internal cavity around its angular extent with a filler duct communicating into the same, the inside periphery of said ring including three equally-spaced, inwardly and radially projecting bosses each having two adjoining flat faces extending inwardly from the ring at an obtuse angle into convergence such that each said face in one boss has a companion face opposite thereto in the next succeeding boss around the ring, each pair of opposite boss faces constituting a pair and the boss faces of each pair respectively having aligned bearing bores communicating into said cavity, the latter being adapted to contain a lubricant communicable to each of said bearing bores; a line roller journalled in the bearing bores of each said pair of faces in a closed array with the contiguous ends of adjoining rollers in meeting contact to roll one against the other and close off entry to a line in between any adjoining roller; a removable closure plug for said duct for charging a lubricant into said cavity; and means attached to said ring for mounting the same on a fishing rod.

References Cited in the file of this patent
UNITED STATES PATENTS

| | | |
|---|---|---|
| 16,992 | Osgood | Apr. 7, 1857 |
| 1,478,643 | Elliott | Dec. 25, 1923 |
| 2,147,063 | Sanford | Feb. 14, 1939 |
| 2,422,353 | Hitt | June 17, 1947 |
| 2,483,760 | Duncan | Oct. 4, 1949 |